United States Patent [19]

Okino et al.

[11] 3,877,776

[45] Apr. 15, 1975

[54] SPECKLE REDUCTION IN HOLOGRAPHY

[75] Inventors: Yoshihiro Okino, Kyoto; Toshiro Kamogawa, Hirakata; Makoto Kato, Kyoto, all of Japan

[73] Assignee: Matsushita Electric Industrial Co., Ltd., Osaka, Japan

[22] Filed: Apr. 25, 1974

[21] Appl. No.: 464,214

Related U.S. Application Data

[63] Continuation of Ser. No. 230,405, Feb. 29, 1972, abandoned.

[30] Foreign Application Priority Data

| | | |
|---|---|---|
| Mar. 1, 1971 | Japan | 46-10737 |
| Mar. 1, 1971 | Japan | 46-10738 |
| Mar. 16, 1971 | Japan | 46-14863 |
| Mar. 16, 1971 | Japan | 46-14864 |
| Oct. 19, 1971 | Japan | 46-83179 |

[52] U.S. Cl. .......... 350/3.5

[51] Int. Cl. .......... G02b 27/00

[58] Field of Search .......... 350/3.5, 162 SF

[56] References Cited

UNITED STATES PATENTS

| | | | |
|---|---|---|---|
| 3,535,013 | 10/1970 | Rosen | 350/3.5 |
| 3,632,181 | 1/1972 | Lee | 350/3.5 |
| 3,650,608 | 3/1972 | Baker | 350/3.5 |

OTHER PUBLICATIONS

Bowman, Applied Optics, Vol. 7, No. 11, Nov. 1968, pp. 2280–2284.

*Primary Examiner*—Ronald J. Stern
*Attorney, Agent, or Firm*—Stevens, Davis, Miller & Mosher

[57] ABSTRACT

Interference dot patterns that would be inevitably introduced in the holographic recording using diffused light have undesirable visual effects. Such undesirable effects can be greatly reduced by utilizing characteristics peculiar to the hologram.

10 Claims, 12 Drawing Figures

SPECKLE REDUCTION IN HOLOGRAPHY

This is a continuation of application Ser. No. 230,405, filed Feb. 29, 1972, now abandoned.

This invention relates to holographic recording and reproducing systems, and its object is to improve the picture quality of reproduced holographic images by apparently reducing or removing interference patterns of numerous fine dots, that is, speckle patterns, that frequently result on the reproduced image when coherent light is used in the recording and reproduction of the picture.

This invention will be clarified by the following description given in connection with embodiments of the invention and with reference to the accompanying drawings; in which.

Figure 1:
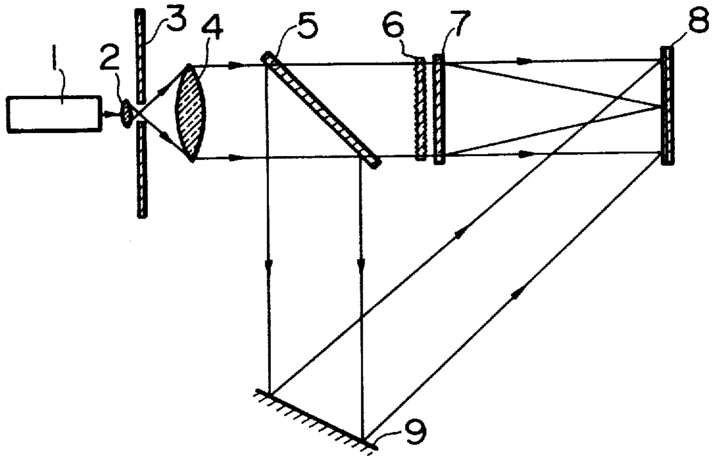
FIGS. 1 to 4 are schematic diagrams for explaining known techniques concerning the production of a hologram and the reproduction of images from the hologram.

FIG. 1 of the accompanying drawing shows an example of the set-up for holographic recording. In this set-up, coherent light such as laser light from a light source 1 is arranged to converge through a lens 2 having a small focal distance on a spatial frequency filter 3. Light having passed through a pin hole at the center of the filter 3 spreads with its intensity distributed uniformly to be collimated by a lens 4 into a parallel light flux to be incident on a half-mirror 5. Part of the incident light flux is transmitted through the half-mirror to enter a diffuser 6, and the diffused light therefrom illuminates an original 7 disposed therebehind. Generally, when coherent light is diffused at a diffusing face which provides random phase distribution over all its points, the resultant light has components directed in random directions and interfering with one another, thus resulting in an interference pattern that would appear as numerous fine dots. Thus, the original 7 is illuminated with light containing such speckle pattern. Light transmitted through the original 7 and refracted therethrough according to the refractive index peculiar to the material thereof is incident on a recording medium 8 placed therebehind. This incident light is hereinafter referred to as the object bean or signal beam. Meanwhile, light reflected by the half-mirror 5 is further reflected by a plane mirror 9 to be incident on the recording medium 8. This light, which is not diffused, is hereinafter referred to as the reference beam. The reference beam and the aforementioned object beam both incident on the recording medium 8 interfere with each other, and the resultant interference pattern is recorded on the recording medium. The record of the original obtained in the above manner is called a hologram.

Figure 2:
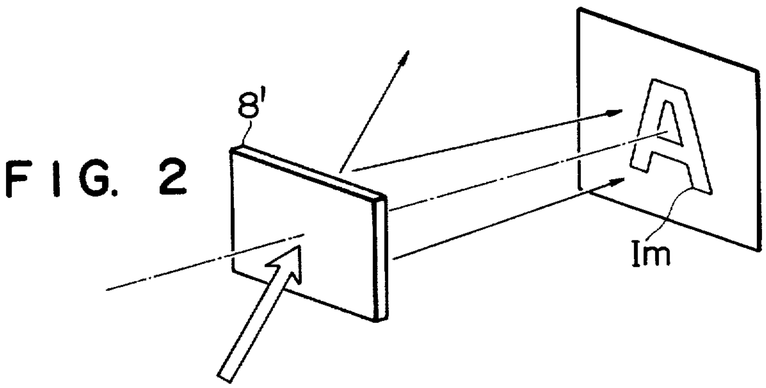

FIG. 2 illustrates a typical way of reproducing such a hologram. In the Figure reference numeral 8' designates a medium carrying a hologram obtained in the above manner. The medium 8' is illuminated with reproducing light having a coherent character and directed in the direction of the bold arrow to reproduce a real image Im on an image plane.

The diffuser 6 in the holographic recording arrangement of FIG. 1 is provided in order to uniformly illuminate the original 7 and render uniform the light incident on the recording medium so that an exposure area of the original having a sufficient linear characteristic may be recorded. Another important purpose is to allow the information of the original 7 to be distributed widely over the recording medium 8 so as to provide increased redundancy. By so doing, as information of any point of the original object is dispersed over a wide region of the hologram, it is possible to recover the whole information of the original even if the hologram is partly damaged or even from only part of the hologram.

With the hologram obtained in the above manner, that is, a hologram of an original illuminated with diffused light from a source of coherent light or a hologram of an original which is a diffuser, however, a speckle pattern of numerous dots stemming from the interference among the diffused light components would inevitably be superimposed upon the reproduced image. Although these dots are hardly appreciable if their mean size is sufficiently small compared to the least required dimension of the disassembled element of the reproduced picture, they would appear as noise if their means size is increased to be comparable with the dimension of the reproduced image element thus extremely deteriorating the picture quality of the reproduced image. This problem which is inherent in the hologram using a diffuser or illuminate with diffused light is particularly serious in cases where high resolution is required and where a small hologram size is required.

According to the invention, while making use of diffused light based on coherent light, means are provided to reduce in effect the speckle pattern stemming from such diffused light.

Prior to describing particular embodiments of the invention, the prior art to which the invention pertains will be discussed in further detail.

The hologam produced in the afore-mentioned holographic recording is called a Fresnel hologram if the original 7 and recording medium 8 are placed comparatively close to each other and the refraction image of the original 7 on the recording medium 8 is based on the Fresnel refraction, while it is called Fraunhofer hologram or Fourier transformed hologram if the refraction image of an original forms a Fraunhofer refraction pattern in the vicinity of the recording surface as will be described hereinafter.

Figure 3:
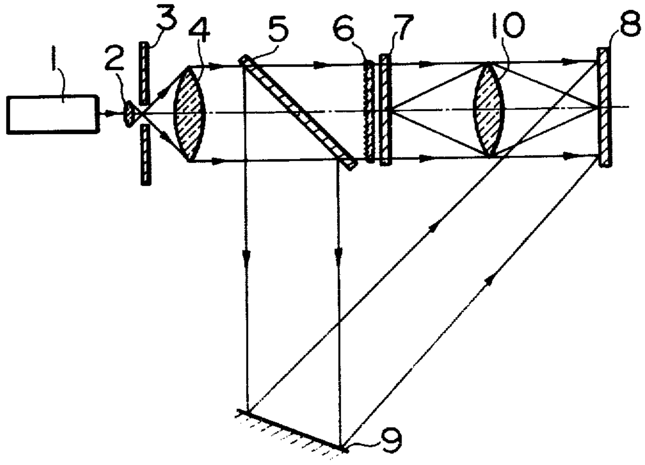

FIG. 3 shows a typical example of the set-up for producing the latter hologram. In this set-up, the parts 1 to 9 are identical to those in the previous set-up, so they are not described. Unlike the previous case, this set-up includes a lens 10 interposed between original 7 and recording medium 8. With this arrangement, a Fraunhofer refraction pattern of the original 7 can be produced on the recording medium 8 so that a Fraunhofer hologram may be obtained.

Figure 4:
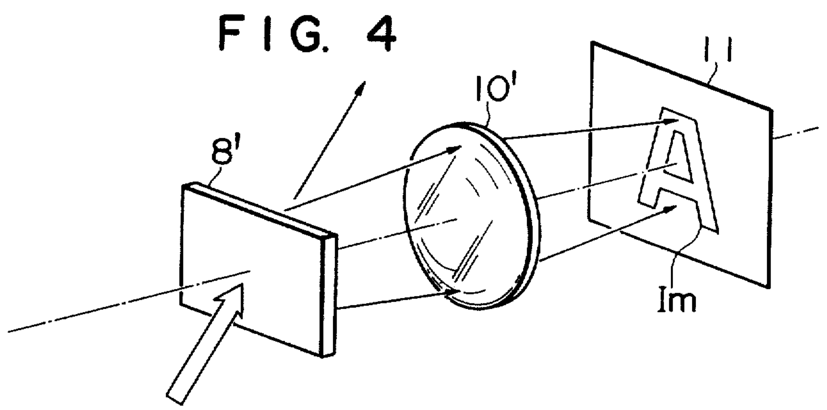

As shown in FIG. 4, in reproduction the hologram 8 thus obtained is illuminated with reproducing light, and the refracted light from the hologram is focused through a lens 10' on an image face 11 to reproduce the original image Im thereon. The feature of such Fraunhofer hologram is that its image is fixed in position.

With the above knowledge of the prior art, the invention will become more apparent from the following description of some preferred embodiments of the invention.

Figure 5:
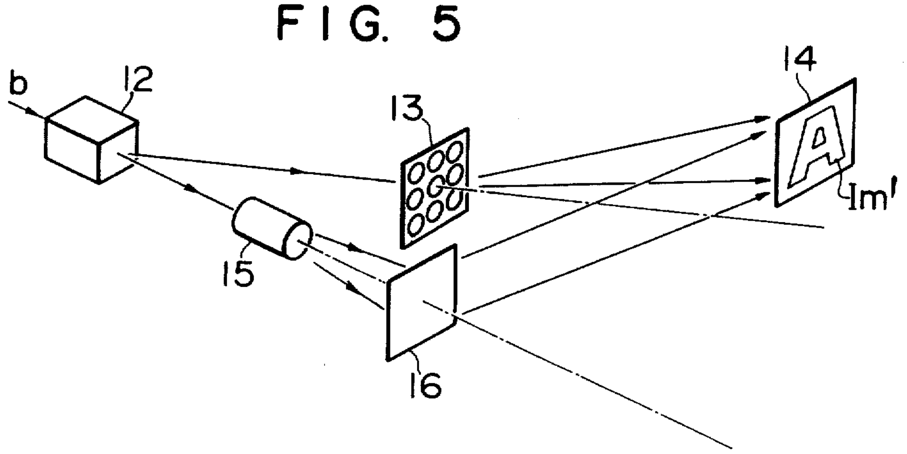
FIGS. 5 to 8 are schematic diagrams respectively showing various embodiments or a part thereof of the system of this invention.

FIG. 5 shows one embodiment of the invention. Referring to the figure, reference numeral 12 designates a two-dimensional deflector for deflecting a part of a light beam incident thereon in the direction of the arrow by a predetermined angle to be incident on a hologram memory plate 13, which has a matrix of many minute unit holograms arranged on its face. One of the unit holograms may thus be illuminated with the light beam from the deflector 12. Light from the illuminated unit hologram and carrying information (image) thereof is focused as reproduced image I*m*' on a predetermined image face 14. Each unit hologram of the hologram memory plate 13 is produced by using diffused light in the manner as described above, so that the reproduced image naturally contains a speckle pattern.

Meanwhile, the light not deflected by the deflector 12 but advancing straight away from it enters a beam expander 15 which spreads the incident light beam and the expanded light beam with an increased diameter is caused to be incident on an auxiliary hologram 16 preferably having greater dimensions compared to the unit hologram of the hologram memory plate 13. The auxiliary hologram is a record of a speckle pattern such that its reproduction may be superimposed upon the aforesaid image Im' in a coherent relation thereto. In this way, the speckle pattern as the reproduction of the auxiliary hologram and the speckle pattern contained in the reproduced image of the memory hologram are combined in a coherent relation to each other, thus causing a new speckle different from any of the above two patterns to appear in the signal pattern. By selecting the effective area of the auxiliary hologram to be larger than that of the memory hologram the speckle pattern of the auxiliary hologram reproduction will be finer than the speckle pattern in the memory hologram reproduction, so that the coherent combination of both the reproduced images would appear as if the memory hologram reproduction were modulated with noise. In other words, the speckle may be rendered finer compared to the signal pattern, which has an illusion effect that the picture quality would seem improved with apparent reduction of the speckle pattern.

In addition to the effect of apparently reducing the speckle pattern contained in the reproduced image, with a finer speckle pattern it is possible, through a suitable filter means, to further improve the picture quality when the reproduced image is picked up by an image pick-up tube and converted into an electric signal.

The intensity of the reproduction of the auxiliary hologram is suitably several to several ten times less than that of the memory hologram. If it is excessively high the background noise would be increased to greatly deteriorate the contrast, and conversely, if it is insufficient the effect of the combination would be less and no substantial improvement of the picture quality can be expected.

Moreover, if the speckle pattern provided through the coherent combination of the reproduction of the auxiliary hologram and the signal image Im' is caused to change continuously by suitably producing relative movement of the two images, for instance by causing vibration of the auxiliary hologram 16, the reproduction may be made to contain a still finer apparent dot pattern through the illusion effect and the integrating effect provided by the image pick-up tube.

Figure 6:
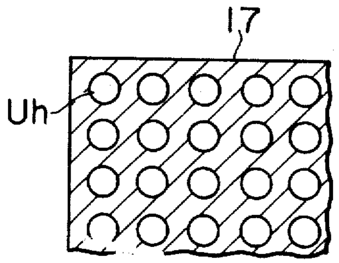

FIG. 6 shows part of a hologram plate in another embodiment of the invention. Referring to the figure, numeral 17 designates a memory hologram plate having a matrix of unit hologram U*h*. It is different from the hologram memory plate 13 in the previous embodiment in that its shaded area has a light diffusing character. If the hologram plate 17 is produced from a photographic plate, for instance, the shaded area may be obtained by grinding the corresponding portion of the glass base plate. In this embodiment, each unit hologram Uh is illuminated with a reproducing light beam which has a diameter greater than the diameter of one unit hologram but not so much greater as to partly illuminate adjacent unit holograms as it is incident on the hologram plate. By making such an arrangement, the diffused light from the shaded area may overlap the reproduced image in a coherent relation thereto to the effect of rendering a finer speckle pattern as mentioned earlier, thus apparently improving the picture quality. In this embodiment, the image light and the diffused light may be continuously displaced in space relative to each other by suitable means such as subjecting the reproducing light beam to a slight vibration, whereby the picture quality may be further improved through the integrating effect as mentioned earlier.

Figures 7, 8:
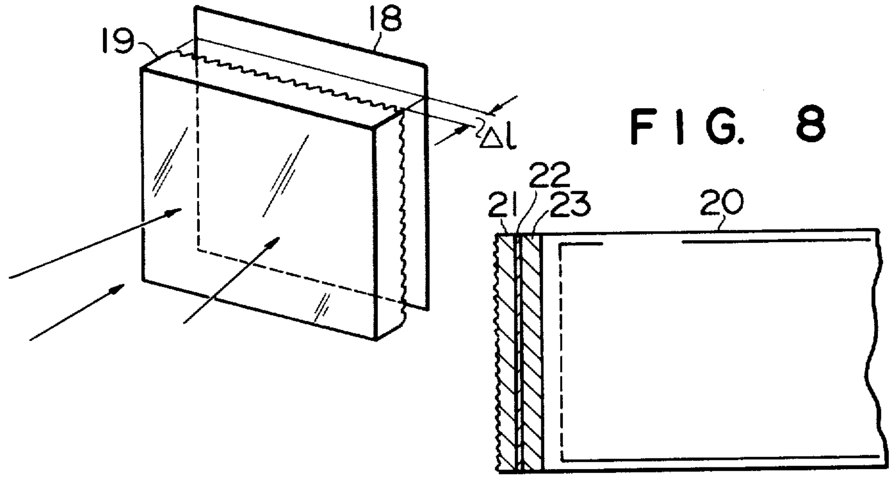

FIG. 7 shows a further embodiment of the invention. Referring to the figure, numeral 18 designates an image face, for instance the one shown in FIG. 2, for focusing a real image of a hologram. Disposed in front of and spaced by $\Delta l$ from the face plate is a transparent diffusing plate 19. The diffusing plate 19 has a character of causing random diffusion of light on its one side, that is, on its side nearer the image face. It may be conveniently made from, for instance, a sufficiently homogeneous flat glass plate, whose one side may effectively be softly and uniformly polished with fine corrundum of a grain size of 2,000 or above to impart the diffusing character. In the absence of the diffusing plate 19, a signal pattern focused on the image face 18 is assumed to contain an appreciable interference dot pattern. With the diffusing plate 19 in position, the signal light is diffused by the diffusing plate 19 so that the pattern speckle contained in the signal light may be modulated or rendered finer through the diffusing effect on the image face immediately behind and spaced $\Delta l$ from the plate 19.

Thus, with the speckle pattern rendered finer compared to the signal pattern, illusion would permit the picture quality to seem improved with apparent reduction of the speckle pattern.

As mentioned earlier, in addition to the effect of apparently reducing the speckle pattern contained in the reproduced image that is obtainable according to this embodiment, with a finer speckle pattern it is possible, through a suitable filter means, to further improve the picture quality where the reproduced image is picked up and converted into an electric signal through an image pick-up tube.

FIG. 8 shows the case of forming the reproduced image directly on an image pick-up tube such as a vidicon. In this case, the photoelectric face 23 of a vidicon 20, for instance, is placed in the position of the image face, and on the side of a transparent electrode opposite the photoelectric face 23 is provided a face plate 21 whose front side is treated to impart the aforementioned diffusing character. In this manner, an image pick-up tube for holographic images may be obtained.

In the previous FIG. 7 embodiment, in order to obtain the intended effect due care should be paid in the selection of the roughness of diffusing surface in front of the image face and the distance $\Delta l$ between the two. The roughness of the diffusing plate is suitably such that the mean dot size of the speckle pattern produced immediately after the diffusing plate is about several times less than the least width of the element of the signal pattern. A coarser diffusing surface than the grade of the above order will tend to deteriorate the picture quality, and conversely, if the surface is too fine no appreciable desired effect can be obtained. As for the afore-said distance $\Delta l$, the larger it is the smoother the speckle pattern, but with an excessive distance blurring of the image becomes conspicous. Therefore, careful design is required in this respect.

Again, if the speckle pattern is caused to change continuously by suitable means such as subjecting the diffusing plate 19 into vibration, the apparent picture quality may be further improved through, for instance, the integrating effect as mentioned earlier.

In the preceding embodiments, it is possible to alleviate the speckle pattern on a mental basis, that is, through the effect of illusion, and to reduce or eliminate it through electric means.

It will be appreciated that various modifications of the above embodiment are possible. In one such modification, the arrangement of FIG. 2 may be employed. More particularly, two-dimensional information (signal image) of the original 7 is first recorded on the recording medium 8. The record thus produced on the recording medium 8 is a Franuhofer hologram of the original 7 illuminated with diffused light. Subsequently, the original 7 and the lens 10 are replaced with a diffusing plate without the rest of the set-up being changed for recording the diffusing plate alone as a Fresnel hologram on the recording medium in superimposition upon the previous record of the signal image. In this manner, the signal image containing a speckle pattern and the speckle pattern of the diffusing plate are recorded respectively as Fraunhofer hologram and Fresnel hologram in multiplex recording on the single recording medium.

In reproduction, the recording medium bearing the multiplex hologram thus obtained is illuminated in the arrangement of FIG. 4 while subjecting the hologram to slight vibration in the plane of the hologram. Insofar as the recording medium executes translational reciprocating motion without any rotational component in the plane of the record surface, the reproduction of the Fraunhofer hologram is spatially fixed owing to the nature thereof so that its signal image and the speckle pattern contained therein remain fixed in position. On the other hand, the reproduction of the speckle pattern which is recorded as Fresnel hologram naturally vibrates with the vibration of the recording medium. Because of the presence of the lens 10', the vibrating Fresenel hologram speckle pattern image is focused on a plane before image face 11 and reproduced as an out-of-focus image on the image face though this reproduction still retains the character of the pattern of speckles. If necessary, it is possible to reduce the Fresenel hologram speckle pattern in scale as it is reproduced on the image face. In the above manner, the combination of the two component images simultaneously reproduced on the image face in a coherently superimposed relation to each other will contain a continuously changing speckle pattern, since such changing speckle pattern is a combination of two speckle patterns superimposed upon each other, one changing its form with the vibration of the recording medium and the other being fixed in position. The way of changing of the resultant speckle pattern is absolutely random because the pattern itself is a random pattern. Thus, by utilizing suitable intergrating measures, the speckle pattern present in the reproduced image may be smoothed and apparently removed. For example, if the speed of the change is high enough, illusion effect or an intergrating effect of an image pick-up tube due to delay in response thereof may be utilized. Also, in case of photographing the reproduced image it is possible to effect time integration for a suitable length of exposure time. In either case, it is possible to alleviate or eliminate the speckle pattern to improve the picture quality.

While in the above modification the signal image has been recorded as a Fraunhofer hologram, the signal image may be recorded as a Fresnel hologram in cases where the image face undergoes continuous displacement together with slight vibration of the hologram. Also, since the afore-mentioned Fresnel hologram speckle pattern acts as background noise tending to deteriorate the contrast of the signal image, the intensity of its reproduction should be carefully selected to obtain an optimum effect; the intensity should be lower than that of the reproduced signal image.

Figure 9:
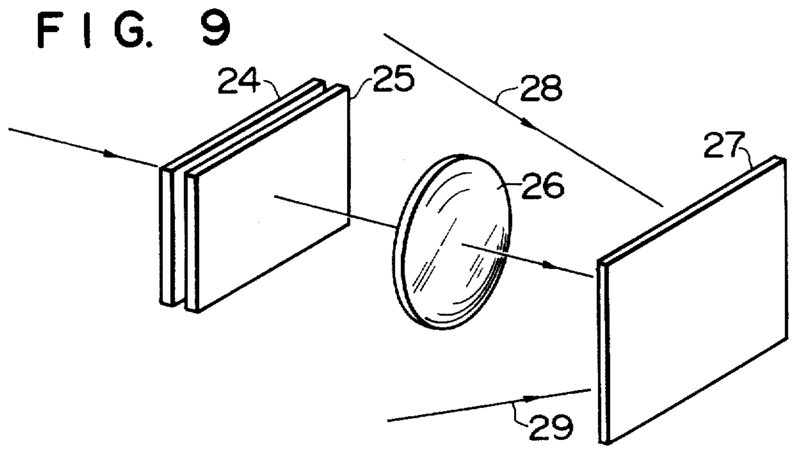
FIGS. 9 to 12 are schematic diagrams showing the measures of the holographic production and reproduction with further embodiments of this invention.

FIG. 9 illustrates a holographic recording method in a still further embodiment of the invention. Referring to the figure, coherent light such as laser light directed in the direction of the arrow enters a diffusing plate 24, and the diffused light therefrom illuminates an original 25. Light transmitted through the original 25 is focused through a lens 26 on a recording medium 27. Meanwhile, reference light beams 28 and 29 having the same coherency as the light from the original are caused to be incident on the recording medium 27 at different incident angles. The reference light fluxes and the light flux from the original 25 interfere with one another and the resultant pattern is recorded on the recording medium 27. The hologram obtained in this manner can be naturally thought to consist of two holograms carrying the same information and superimposed upon each other.

Figure 10:
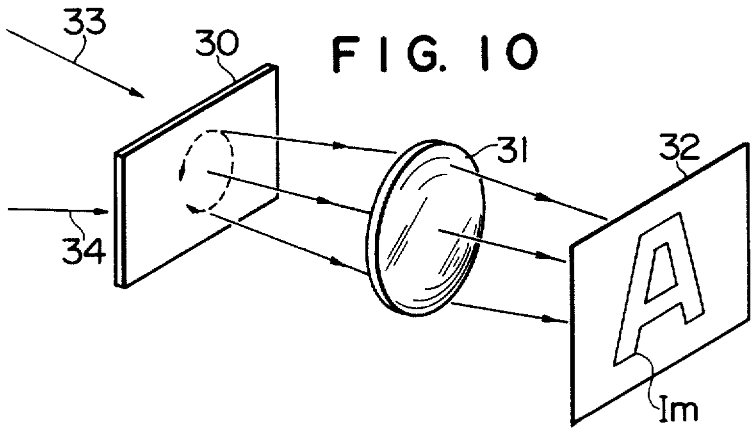

As shown in FIG. 10, in reproduction the hologram plate 30 carrying the hologram obtained in the above manner may be illuminated either with a reproducing light beam 33 incident on it in the same direction as that of the beam 28 in FIG. 9 or with a reproducing light beam 34 in the same direction as that of the beam 29 in FIG. 9 to obtain the same reproduced image Im focused on an image face 26 in the same position so long as the same reproducing lens 31 is provided in the same position. When the hologram plate is simultaneously illuminated with the two light beams 33 and 34, two reproduced images coherently superimposed upon each other may be obtained. Generally, with a Fraunhofer hologram produced by the above arrangement its reproduced image is fixed in position even if it executes translation motion within its plane, but if it executes a rotational motion, for instance within its plane, its reproduced image also rotates within the plane of the image face. Accordingly, if the hologram plate 30 is rotated slightly back and forth in the opposite directions of dashed arrows, the reproduced images Im(I) and Im(II) of the respective reproducing light beams 33 and 34 will undergo repeated deviation from each other because the two reproducing light beams have different incident angles. Since the resultant reproduced image Im under obervation is a coherent combination of the two component images Im(I) and Im(II) superimposed upon each other, the resultant speckle pattern from the speckle patterns contained therein will change according to the aforesaid deviation. The way of changing of the resultant speckle pattern is absolutely random because the pattern itself is random. Thus, by utilizing an integrating effect of a suitable available means the speckle pattern present in the reproduced image may be smoothed and apparently removed. For example, if the speed of the change is high enough, an illusion effect or an integrating effect of an image pick-up tube due to delay in response thereof may be utilized. Also, in the case of photographing the reproduced image it is possible to effect time integration for suitable length of exposure time. In either case, it is possible to alleviate or eliminate the speckle pattern to improve the picture quality.

It is to be noted that the relative deviation of the two component images constitutes the out-of-focus component of the resultant image, so that it is necessary to take the required resolution into due consideration in selecting the amplitude of the slight repetitive rotational displacement of the hologram plate.

Also, while in the preceding embodiment the speckle pattern has been changed by causing the hologram plate to execute repetitive rotational displacement, the change may be provided by a variety of other methods, for instance by causing the hologram plate to execute a slight movement so as to produce change in the incident angle of the reproducing light beam or by causing slight vibrations of the reproducing light beams themselves, in accordance with the method of recording and the purpose of the hologram.

Further, while in the preceding embodiment two reference light beams for recording and two reproducing light beams have been used, similar effects may of course be obtained by using more then two reference or reproducing light beams.

A practical form of the holographic recording and reproducing system according to the invention will now be described in connection with FIGS. 11 and 12.

Figure 11:
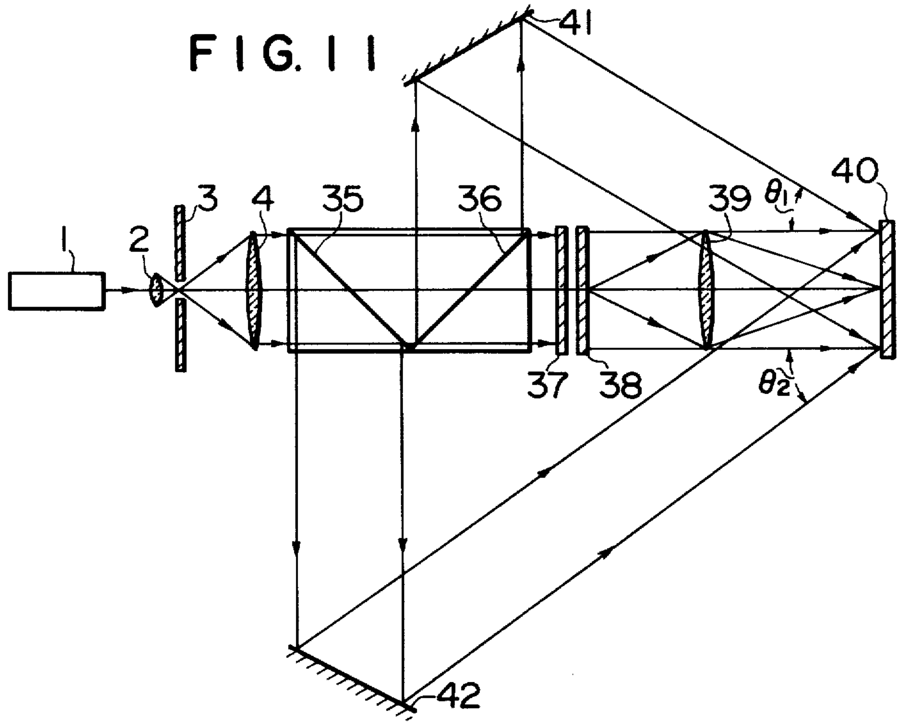

FIG. 11 is a schematic representation of an optical arrangement for holographic recording embodying the invention. This arrangement is actually a combination of the arrangements of FIGS. 3 and 9. Referring to FIG. 11, numerals 1 to 4 respectively designate laser light source, lens, pin hole plate (spatial frequency filter) and lens all similar to the corresponding ones shown in FIG. 3. In this arrangement, the parallel light flux is partly reflected by two beam splitters 35 and 36, and the light transmitted through these beam splitters is diffused by a diffusing plate 37 prior to illuminating an original 38. The image light from the original passes through a lens 39 and is projected as a Fourier transformed image on a recording medium 40. Meanwhile, the reflected light beams from the respective beam splitters 35 and 36 are further reflected by respective reflecting mirrors 41 and 42 to be projected as reference light beams on the recording medium 40 in superimposition upon the original image at respective incident angles $\theta_1$ and $\theta_2$. The record obtained in this manner can naturally be considered to consist of two images of the same original placed on the respective reference waves in multiplex recording. Of course, each of the two images contains a speckle pattern.

Figure 12:
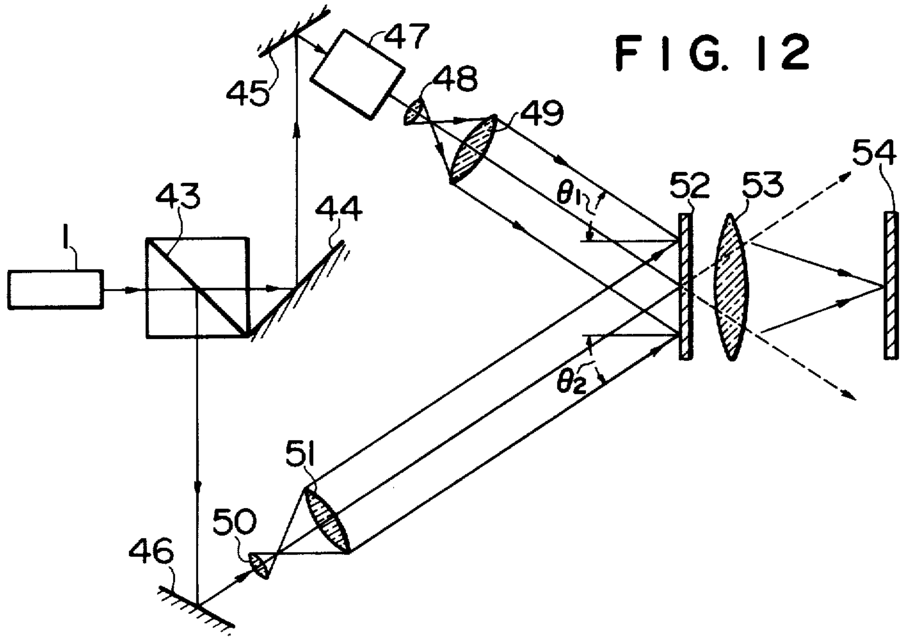

FIG. 12 shows an optical arrangement for the reproduction from the hologram obtained in the above manner. Numeral 1 designates a source of coherent light (for instance a laser light source similar to the one mentioned above). The light beam from the light source is split by a beam splitter 43 into two beams. On of the split beams is projected on a hologram plate 52 of the hologram obtained in the above manner via the path of reflecting mirrors 44 and 45 and lenses 48 and 49, while the other split beam is projected on the same hologram plate via the path of a reflecting mirror 46 and lenses 50 and 51. The angles of incidence of these beams are the same as the respective reference light beams at the time of recording. Thus, the two images recorded on the hologram plate 52 are reproduced through a Fourier transformation lens 53 on an image face 54 in a superimposed relation to each other. Of course, each of the two reproductions of the images which were recorded by using the diffused light as mentioned above contains a speckle pattern, and since the resultant reproduced image under observation of the two component images superimposed upon each other, it also contains a considerable resultant speckle. Numeral 47 designates a phase shifter which is inserted in the optical path of one of the split light beams for shifting the phase of one split light beam with respect to the phase of the other. With this means it is possible to remove the speckle pattern introduced into the reproduced image by utilizing an integrating effect. In other words, it is possible to practically eliminate the adverse effects of the speckle pattern stemming from the diffuser or diffused illuminating light upon the picture quality. Thus, it is possible to use diffused illuminating light even where the hologram size required is very small. Also, it is possible to attain high density hologram. As has been described, the industrial merit of the invention is very great in that it provides a solution to the difficulty that has been encountered in making practical use of the holography.

What we claim is:

1. A method of recording and reproducing a holographic image, comprising the steps of: recording a holographic image by:

illuminating an object, the image of which is to be recorded, with a first coherent beam of light;

projecting a Fraunhofer diffraction pattern of said object onto a recording medium;

projecting at least two reference beams of coherent light onto said recording medium in superposition with the projected image of said object, said reference beams impinging on said recording medium at angles of incidence $\theta_1$ and $\theta_2$ with respect to the angle of incidence of projection of said illuminated image onto said recording medium; and reconstructing the recorded holographic image by:

illuminating the image on said recording medium with two coherent beams of light projected onto said recording medium with angles of incidence which correspond to the angles $\theta_1$ and $\theta_2$ of said reference beams, said two coherent beams reproducing two corresponding superimposed images; and displacing said recording medium in a generally rotational manner in the plane of the image face thereof to produce an out-of-focus component, the rotational displacement being sufficiently small so as to keep said out-of-focus component from visually obscuring the reproduced holographic image, thereby causing speckle patterns individually contained in the respective reproduced superimposed images to overlap each other.

2. The method according to claim 1, comprising the further step of projecting said first coherent beam through an optical diffuser before illuminating said object.

3. The method according to claim 1, further comprising projecting said first coherent beam through a beam splitter located between the source of said first coherent beam and said object to thereby produce said at least two reference beams.

4. A method for reconstructing a holographic image, comprising the steps of:

illuminating a hologram having an image recorded thereon with a first beam of coherent light to reconstruct and project said image;

illuminating a translucent diffuser with a second beam of light coherent with said first coherent light beam and laterally displaced therefrom, said translucent diffuser upon illumination producing only a speckle pattern which is finer than the speckle pattern inherently produced when reconstructing the image from said hologram; and superimposing said speckle pattern of said translucent diffuser and said projected image onto each other in coherent relation to produce an apparent visually finer speckle pattern and the speckle pattern of said reconstructed image along.

5. The method according to claim 4, further comprising the step of displacing said hologram and translucent diffuser relative to each other to produce relative movement between said superimposed speckle pattern and reconstructed image.

6. Apparatus for reconstruction holographic images, comprising:

a hologram having an image recorded thereon;

a stationary translucent diffuser having a fixed pattern;

means for illuminating said hologram and said translucent diffuser with coherent light to reconstruct said image from said hologram and to produce only a speckle pattern from said translucent diffuser which is finer than the speckle pattern inherently produced when reconstructing said image from said hologram;

said illuminating means illuminating said hologram and said translucent diffuser in a manner to superimpose the projected reconstructed image from said hologram and the projected speckle pattern from said translucent diffuser onto each other in coherent relation to produce a visually apparent finer speckle pattern than is produced by said projected image alone.

7. The apparatus according to claim 6, wherein said translucent diffuser comprises a hologram having said diffuser recorded thereon, and said illuminating means comprises a first beam illuminating said image recorded hologram and a second beam illuminating said diffuser record hologram.

8. The apparatus according to claim 6, wherein said hologram comprises a matrix of a plurality of individual holograms on a single plate and said diffuser comprises the spaces on said plate between adjacent ones of said individual holograms.

9. The apparatus according to claim 8, wherein said illuninating means comprises a composite beam having a diameter at the plane of said plate which is greater than the width of an individual hologram and less than the distance from the center of one individual hologram to the outer edge of a next adjacent individual hologram.

10. A method for reconstructing a holographic image from a hologram plate, comprising a matrix of a plurality of individual holograms on a single plate and a translucent diffuser comprising the spaces on said plate between said individual holograms, with a coherent light beam having a diameter at the plane of said plate which is greater than the width of an individual hologram and less than twice the distance from the center of one individual hologram to the outer edge of a next adjacent individual hologram, said method comprising the steps of:

illuminating said hologram plate with said coherent light beam to construct and project an image recorded thereon, whereby said translucent diffuser is illumninated with said coherent light beam, said translucent diffuser upon illumination producing only a speckle pattern which is finer then the speckle pattern inherently produced when reconstructing the image from said hologram;

superimposing said speckle pattern of said translucent diffuser and said projected image onto each other in coherent relation to produce an apparent visually finer speckle pattern than the speckle pattern of said reconstructed image alone; and displacing said coherent beam and said plate relative to each other to produce relative movement therebetween.

* * * * *